(12) United States Patent
Hellsten et al.

(10) Patent No.: US 8,653,009 B2
(45) Date of Patent: Feb. 18, 2014

(54) METHOD FOR PREVENTING THE FORMATION OF CALCIUM CARBOXYLATE DEPOSITS IN THE DEWATERING PROCESS FOR CRUDE OIL/WATER STREAMS

(75) Inventors: Martin Hellsten, Ödsmål (SE); Ingemar Uneback, Svenshogen (SE)

(73) Assignee: AKZO Nobel N.V., Arnhem (NL)

( * ) Notice: Subject to any disclaimer, the term of this patent is extended or adjusted under 35 U.S.C. 154(b) by 582 days.

(21) Appl. No.: 12/665,358

(22) PCT Filed: Jun. 18, 2008

(86) PCT No.: PCT/EP2008/057641
§ 371 (c)(1),
(2), (4) Date: Jan. 21, 2010

(87) PCT Pub. No.: WO2008/155333
PCT Pub. Date: Dec. 24, 2008

(65) Prior Publication Data
US 2010/0137167 A1    Jun. 3, 2010

Related U.S. Application Data

(60) Provisional application No. 60/965,914, filed on Aug. 23, 2007.

(30) Foreign Application Priority Data

Jun. 20, 2007 (EP) .................................. 07110671

(51) Int. Cl.
*C09K 8/528* (2006.01)
(52) U.S. Cl.
USPC ............. 507/90; 507/235; 507/236; 507/237; 507/239; 507/241; 507/244; 507/245; 507/246; 166/305.1
(58) Field of Classification Search
USPC ............. 507/90, 100, 240, 241, 244; 166/304
See application file for complete search history.

(56) References Cited

U.S. PATENT DOCUMENTS

| | | | | |
|---|---|---|---|---|
| 4,409,108 A * | 10/1983 | Carney et al. | ................. | 507/138 |
| 5,421,993 A | 6/1995 | Hille et al. | | |
| 5,961,821 A | 10/1999 | Varadaraj et al. | | |
| 6,096,196 A | 8/2000 | Varadaraj et al. | | |
| 8,012,914 B2 * | 9/2011 | Welton | ........................... | 507/261 |
| 2005/0282711 A1 | 12/2005 | Ubbels et al. | | |

FOREIGN PATENT DOCUMENTS

| | | |
|---|---|---|
| EP | 0 881 274 A2 | 2/1998 |
| WO | WO 98/42795 | 10/1998 |
| WO | WO 99/50375 | 10/1999 |
| WO | WO 99/50376 | 10/1999 |
| WO | WO 2006/025912 A2 | 3/2006 |

OTHER PUBLICATIONS

Goldszal A et al "Scale and Napthalene Inhibition in Deep-Offshore Fields"; SPE Oilfield Scale Symposium, SPE74661 (2002) Aberdeen, UK.
Hanneseth et al, "Formation, Growth and Inhibition of Calcium Naphtenate particles in Oil/Water Systems as . . . ," JJ Dispersion Sci Technol. 27, pp. 185-192 (2006).
International Search Report for International Application No. PCT/EP2008/057641, Sep. 23, 2008.

* cited by examiner

*Primary Examiner* — John J Figueroa
(74) *Attorney, Agent, or Firm* — Norris McLaughlin & Marcus, P.A.

(57) ABSTRACT

The invention relates to the use of compounds comprising three hydrophobic groups as additives to a stream of crude oil containing carboxylic acids, in particular naphthenic acids, and salt water, to prevent the formation of calcium carboxylates when the fluid is exposed to shear forces. Preferably, the compounds are added to a crude oil/water stream containing organic acids $Ca^{2+}$ ions at a point between the well and the pressure reduction valve in the crude oil receiving station. The compounds have the formula (I) wherein hydrophobic groups R, R', and R" are, independently, an optionally substituted hydrocarbyl group or an optionally substituted acyl group having 4-22 carbon atoms; X is N, P=O or CR'", wherein R'" is H or a C1-C4 alkyl group; Y is C=O or $CH_2$; a, a', a" b, b' and b" each independently are 0 or 1, the subscript 0-1 meaning that if the subscript is 0, then the group is not present in the molecule, whereas if the subscript is 1, then the group is present in the molecule; n, n', and n" are, independently, zero or on average at least 1, and at most 14; the sum of n, n', and n" is 0 or on average at least 3, and at most 42; and m, m', and m" are, independently, on average 0-6, and the sum of m, m', and m" is 0-18.

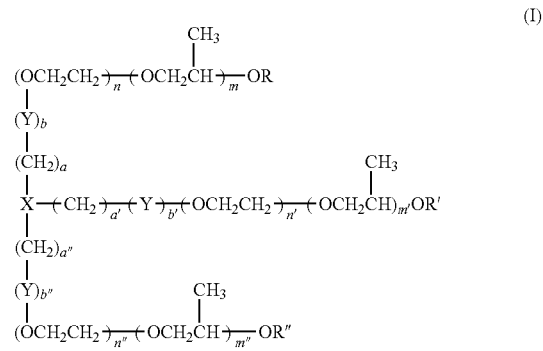

18 Claims, No Drawings

METHOD FOR PREVENTING THE FORMATION OF CALCIUM CARBOXYLATE DEPOSITS IN THE DEWATERING PROCESS FOR CRUDE OIL/WATER STREAMS

The present invention relates to the use of optionally ethoxylated compounds comprising three hydrophobic groups as additives to a stream of crude oil containing carboxylic acids, in particular naphthenic acids, and salt water, to prevent the formation of calcium carboxylates when the fluid is exposed to shear forces.

In oil producing processes, the crude oil travelling from the production well to the receiving station normally consists of a mixture of oil, gas, and water under high pressure. In this multiphase flow the various components normally are quite well separated, but when the flow passes the valve where the pressure is reduced, the high shear forces will emulsify water into the oil phase. According to unproven theory, at this point carbon dioxide that has been dissolved in the crude oil is released, whereby the pH is increased, leading to an enhanced dissociation of the carboxylic acids present at the oil/water interface which in turn favours the reaction between calcium ions and the carboxylate ions formed. The carboxylic acids present in the crude oil are for the most part the so-called naphthenic acids, but also straight/branched chain carboxylic acids are present. Naphthenic acids are herein defined as carboxylic acids which include one or more saturated ring structures, such as derivatives of cyclopentane, cyclohexane, cycloheptane or other alicyclic homologues. In addition to the monoacids also high molecular weight C80 tetrabasic acids, the so-called ARN acids, are present, which are considered to create particular problems.

The first step in the reaction between calcium ions and the carboxylate ions is the formation of a positively charged 1:1 compound $CaL^+$, wherein L represents the carboxylate ion. This compound attracts a further carboxylate ion forming the neutral and lipophilic 1:2 compound $CaL_2$. This $CaL_2$, together with the polymeric and net-forming calcium salt of the C80 tetra-acids, will create the troublesome deposits in the equipment for the oil/water separation.

The first treatment of the crude oil at the receiving station thus normally is a warming in heat exchangers and a dewatering process performed in hydrocyclones and gravity separators.

When the crude oil contains significant amounts of carboxylic acids, and particularly the tetrameric C80 acids mentioned above, very harmful deposits of the corresponding calcium compounds may form. These calcium carboxylates can form a thick layer between water and oil in the separators and also a hard and sticky layer on the walls in the apparatuses.

Due to these deposits a complete shut-down of the process is often necessary in order to make a cleaning operation possible.

By adding a compound according to the present invention to the crude oil/water stream upstream of the pressure reduction valve, it is possible to prevent the formation of calcium carboxylates almost completely, and thereby also to prevent the harmful deposits from forming.

The previous way to solve this problem was to add a moderately strong acid, e.g. formic acid, to the crude oil and thus keep the naphthenic acids in the protonated form. In this shape they cannot react with calcium ions and form calcium naphthenates. (see A. Goldszal, C. Hurtevent, and G. Rousseau, "Scale and Naphthenate Inhibition in Deep-Offshore Fields", SPE Oilfield Scale Symposium, *SPE*74661, (2002) Aberdeen, UK). The most important drawback to the use of acids is the sharply increased corrosion rate of all metal parts that come into contact with the fluid.

Basic solutions have been used to remove naphthenic acids from the crude oil. In EP 0 881 274 aqueous base is used to treat the crude oil to form an unstable emulsion, optionally in the presence of a non-ionic surfactant, preferably a straight chain ethoxylated alcohol having a C12-C18 alkyl group and 10-50 EO units, which emulsion is then destabilised with the aid of gravity or an electrostatic field. When the starting acidic crude is a calcium-containing crude, the calcium is typically present as an insoluble, calcium-containing phase between the first and second phases when the emulsion is broken. This is a disadvantage, since this phase must be removed and disposed of.

In U.S. Pat. No. 5,961,821 a process for refining crude oil by extracting organic acids including naphthenic acids, heavy metals, and sulphur from a starting crude oil into water is disclosed, comprising the step of treating the starting crude oil with an amount of an ethoxylated amine and water, where the ethoxylated amine has the formula

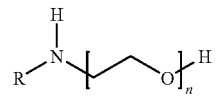

wherein R is $C_3$ to $C_6$ hydrocarbon and n=1-10. The salts obtained between the amines and the naphthenic acids are water-soluble, and thus removed by separation of the water phase. However, to be effective against the formation of Ca-naphthenate, an extraction process would have to take place before the pressure reduction in the receiving station, which seems to be hard to achieve.

In U.S. Pat. No. 6,096,196 a similar process is disclosed, where the crude oil is treated with an alkoxylated amine selected from a group of alkoxylated amines which comprises compounds having the formula

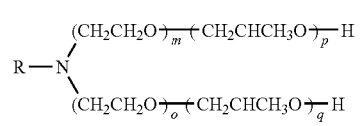

wherein R is a linear or branched alkyl group of $C_8$ to $C_{20}$, preferably $C_{10}$ to $C_{14}$, m+o=2-50, preferably 5-15, and p+q=0-15, preferably 0.

In U.S. Pat. No. 5,421,993 alkoxylated monoalkylmonoamines, dialkylmonoamines, monoalkyldiamines, and monoalkyltriamines (Y-triamines) are disclosed as demulsifiers, corrosion inhibitors and/or pour point depressants in crude oils. The compounds are produced by reacting the required $C_6$ to $C_{22}$-alkylamine with 5-40, preferably 8-20 moles of ethylene oxide in a first step, followed by reaction with 5-70, preferably 10-30 moles of propylene oxide in a second step. Optionally, the compounds may then be reacted further with ethylene oxide.

US 2005/0282711 discloses methods and compositions for inhibiting the formation of naphthenate precipitates or naphthenate stabilised emulsions during contact between crude oil containing naphthenic acid and water containing cations, e.g. Ca cations, by adding an inhibitor composition, which composition may be a surfactant, such as an anionic surfactant, an amphoteric surfactant, or a combination thereof. The preferred naphthenate inhibitor compositions include an anionic or amphoteric surfactant, such as a mono- and/or a dialkyl phosphate ester and sulphonic acids.

However, there is still a need to effectively prevent the formation of Ca-naphthenate precipitates and/or Ca-naphthenate stabilised emulsions in the processing of crude oil.

Now it has surprisingly been found that the addition to a crude oil/water stream containing carboxylic acids and $Ca^{2+}$ ions of a compound having the formula (I)

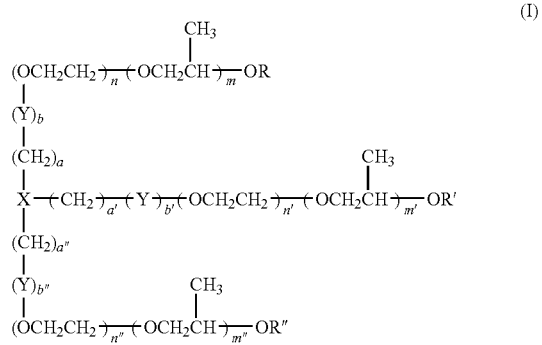

wherein hydrophobic groups R, R', and R" are, independently, an optionally substituted hydrocarbyl group or an optionally substituted acyl group having 4-22, preferably 6-22, more preferably 8-22, and most preferably 10-22 carbon atoms; X is N, P=O or CR''', wherein R''' is H or a C1-C4 alkyl group; Y is C=O or $CH_2$; a, a', a", b, b', and b" each independently are 0 or 1, the subscript 0-1 meaning that if the subscript is 0, then the group is not present in the molecule, whereas if the subscript is 1, then the group is present in the molecule; n, n', and n" are, independently, zero or on average at least 1, preferably at least 2, more preferably at least 3, and most preferably at least 4, and n, n', and n" are, independently, on average at most 14, preferably at most 12, more preferably at most 10, and most preferably at most 8; the sum of n, n', and n" is 0 or on average at least 3, preferably at least 6, more preferably at least 9, and most preferably at least 12, and the sum of n, n', and n" is on average at most 42, preferably at most 36, more preferably at most 30, and most preferably at most 24; and m, m', and m" are, independently, on average a number in the range of 0-6, preferably 0-4, and most preferably 0-2, the sum of m, m', and m" in the molecule being 0-18, preferably 0-12, and most preferably 0-6, at a point upstream of the pressure reduction valve in the receiving station will prevent the formation of calcium carboxylates almost completely.

The advantage of using the compounds of the present invention is that they do not give rise to any emulsion formation, and due to their solubility characteristics, they will remain in the oil phase. Also, the amounts needed are much lower for the compounds of the present invention than for the acidic compounds used in the prior art.

The compounds are all surfactants having three hydrophobic groups, which property is essential for obtaining this excellent ability to act as calcium naphthenate inhibitors. Examples of compounds according to formula (I) are ortho esters substituted with three hydrophobic groups, nitrilotriacetic acid esters with hydrophobic alcohols, triglycerides, triethanolamine esters with fatty acids, and trialkyl phosphate esters. These compounds are either non-ionic or cationic surfactants, the nitrogen-containing compounds being non-ionic or cationic depending on pH.

All of these compounds may also have polyethyleneoxy and/or polypropyleneoxy groups included in their structures, and such structures including ethyleneoxy groups are preferred. When present, the ethyleneoxy and propyleneoxy groups may be added in blocks in either order or may be added randomly, but preferably, the polypropyleneoxy groups are situated closest to the hydrophobic groups. The number of ethyleneoxy groups is balanced against the hydrophobic groups to obtain a suitable solubility of the compounds in both the oil and the water phase, giving rise to a strong surface activity at the oil/water interphase. Consequently, compounds having longer hydrocarbyl groups attached need more ethyleneoxy groups to obtain a suitable balance, whereas compounds having shorter hydrocarbyl groups may not need any ethyleneoxy groups at all. Since the hydrophilic properties of the ethoxylated products vary with the temperature, the maximum inhibitory effect at different temperatures occurs for compounds having different amounts of ethyleneoxy units. The skilled person will not face any problems finding the optimum amount of EO for each compound class and temperature by routine experimentation.

In one embodiment the inhibitor is an ortho ester compound having the structure

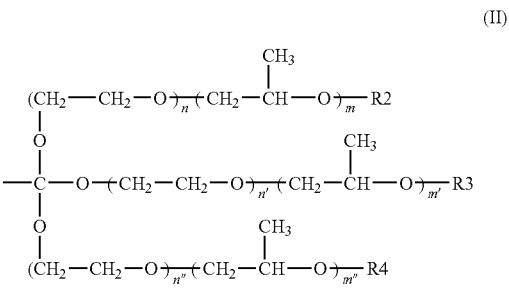

wherein R1 is H or a C1-C4 alkyl group, R2, R3, and R4 are, independently, a C4-C22, preferably C6-C22, more preferably C8-C22, and most preferably C10-C22 hydrocarbyl group; n, n', and n" are, independently, zero or on average at least 1, preferably at least 2, more preferably at least 3, and most preferably at least 4, and n, n', and n" are, independently, on average at most 14, preferably at most 12, more preferably at most 10, and most preferably at most 8; the sum of n, n', and n" is 0 or on average at least 3, preferably at least 6, more preferably at least 9, and most preferably at least 12, and the sum of n, n', and n" is on average at most 42, preferably at most 36, more preferably at most 30, and most preferably at most 24; and m, m', and m" are, independently, on average a number in the range of 0-6, preferably 0-4, and most preferably 0-2, the sum of m, m', and m" in the molecule being 0-18, preferably 0-12, and most preferably 0-6.

In a second embodiment the inhibitor is a nitrilotriacetic acid ester having the structure

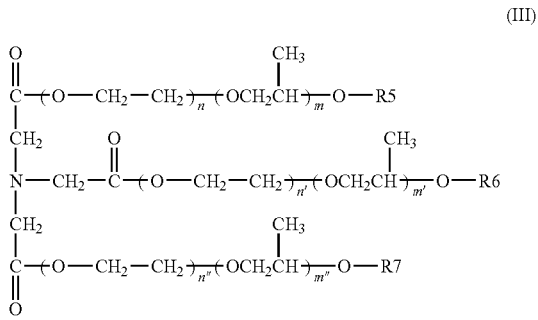

wherein R5, R6, and R7 are, independently, a C4 to C22 hydrocarbyl group; n, n', and n" are, independently, zero or on average at least 1, preferably at least 2, more preferably at least 3, and most preferably at least 4, and n, n', and n" are, independently, on average at most 14, preferably at most 12, more preferably at most 10, and most preferably at most 8; the sum of n, n', and n" is 0 or on average at least 3, preferably at least 6, more preferably at least 9, and most preferably at least 12, and the sum of n, n', and n" is on average at most 42, preferably at most 36, more preferably at most 30, and most preferably at most 24; and m, m', and m" are, independently, on average a number in the range of 0-6, preferably 0-4, and most preferably 0-2, the sum of m, m', and m" in the molecule being 0-18, preferably 0-12, and most preferably 0-6.

In a third embodiment the inhibitor is a triglyceride having the structure

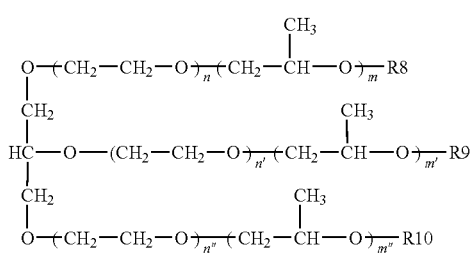

(IV)

wherein R8, R9, and R10 are, independently, an optionally substituted acyl group with 6 to 22 carbon atoms, the acyl group preferably being derived from ricinoleic acid; n, n', and n" are, independently, zero or on average at least 1, preferably at least 2, more preferably at least 3, and most preferably at least 4, and n, n', and n" are, independently, on average at most 14, preferably at most 12, more preferably at most 10, and most preferably at most 8; the sum of n, n', and n" is 0 or on average at least 3, preferably at least 6, more preferably at least 9, and most preferably at least 12, and the sum of n, n', and n" is on average at most 42, preferably at most 36, more preferably at most 30, and most preferably at most 24; and m, m', and m" are, independently, on average a number in the range of 0-6, preferably 0-4, and most preferably 0-2, the sum of m, m', and m" in the molecule being 0-18, preferably 0-12, and most preferably 0-6.

In an especially preferred embodiment compound IV is castor oil that has been ethoxylated with 3 to 30 moles of ethylene oxide.

In a fourth embodiment the inhibitor is a triethanolamine or alkoxylated triethanolamine ester having the structure

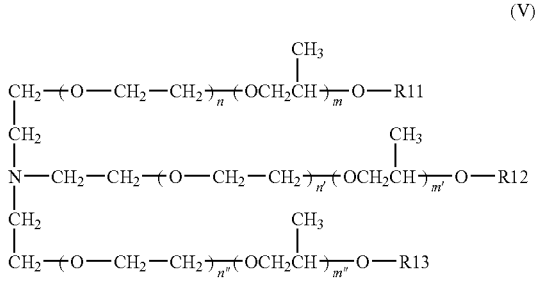

(V)

wherein R11, R12, and R13 are, independently, an optionally substituted acyl group with 6 to 22 carbon atoms; n, n', and n" are, independently, zero or on average at least 1, preferably at least 2, more preferably at least 3, and most preferably at least 4, and n, n', and n" are, independently, on average at most 14, preferably at most 12, more preferably at most 10, and most preferably at most 8; the sum of n, n', and n" is 0 or on average at least 3, preferably at least 6, more preferably at least 9, and most preferably at least 12, and the sum of n, n', and n" is on average at most 42, preferably at most 36, more preferably at most 30, and most preferably at most 24; and m, m', and m" are, independently, on average a number in the range of 0-6, preferably 0-4, and most preferably 0-2, the sum of m, m', and m" in the molecule being 0-18, preferably 0-12, and most preferably 0-6.

In a fifth embodiment the inhibitor is a trialkyl phosphate ester having the formula

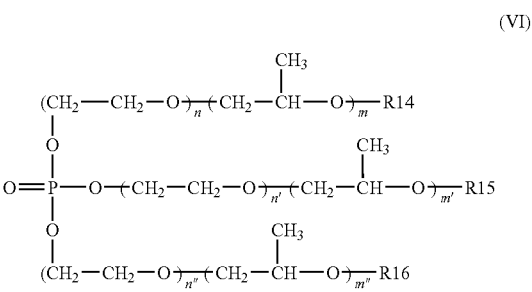

(VI)

wherein R14, R15, and R16 are, independently, a C10 to C22 hydrocarbyl group; n, n', and n" are, independently, zero or on average at least 1, preferably at least 2, more preferably at least 3, and most preferably at least 4, and n, n', and n" are, independently, on average at most 14, preferably at most 12, more preferably at most 10, and most preferably at most 8; the sum of n, n', and n" is on average 0 or at least 3, preferably at least 6, more preferably at least 9, and most preferably at least 12, and the sum of n, n', and n" is on average at most 42, preferably at most 36, more preferably at most 30, and most preferably at most 24; and m, m', and m" are, independently, on average a number in the range of 0-6, preferably 0-4, and most preferably 0-2, the sum of m, m', and m" in the molecule being 0-18, preferably 0-12, and most preferably 0-6.

Of the compounds II to VI, the ethoxylated triglyceride compounds having the formula IV are most preferred due to their good biodegradability and non-toxicity. The least preferred compounds are the trialkyl phosphate esters of formula VI, since these compounds are more uneconomical to make than the other compounds.

The methods to produce the products I-VI are known to the man skilled in the art and include alkoxylations and esterifications. Wherever the degree of alkoxylation is discussed, the numbers referred to are molar average numbers. For alkoxylation, any catalysts known in the art may be used.

Compounds according to formula II may suitably be made by reacting an ortho ester having lower alkyl substituents, such as C1 to C4 alkyl groups, e.g. triethyl orthoformate or triethyl orthoacetate, with alcohols or alkoxylated alcohols.

Compounds according to formula III may suitably be made by esterifying nitrilotriacetic acid with alcohols or alkoxylated alcohols.

Compounds according to formula IV may suitably be made by alkoxylation of a triglyceride.

Compounds according to formula V may suitably be made by esterifying triethanolamine or alkoxylated triethanolamine with a carboxylic acid.

Compounds according to formula VI may suitably be made by reacting an alcohol or an alkoxylated alcohol with $POCl_3$.

Due to the synthesis methods, the compounds according to formulae I-VI may also contain minor amounts of mono- and di-substituted species. However, the mixtures of compounds can suitably be used as inhibitors for the formation of calcium carboxylates in accordance with the invention.

Suitable examples of compounds according to formula (II) are tri-(2-ethylhexanol+4EO)orthoformate, tri-(2-ethylhexanol+2PO+4EO)orthoformate, tri-(n-octanol+4EO)orthoformate, tri-(2-propylheptanol+5EO)orthoformate, tri-(2-propylheptanol+6EO)Orthoformate, tri-(2-propylheptanol+7EO)-orthoformate, tri-(n-decanol+5EO)Orthoformate, tri-(n-decanol+6EO)orthoformate, tri-(n-decanol+7EO)orthoformate, tri-($C_9C_{11}$-alcohol+5.5EO)orthoformate, tri-($C_9C_{11}$-alcohol+6EO)orthoformate, tri-($C_9C_{11}$-alcohol+7EO)orthoformate, tri-($C_{12}C_{1-4}$-alcohol+6EO)orthoformate, tri-($C_{12}C_{14}$-alcohol+7EO)-orthoformate, tri-($C_{12}C_{14}$-alcohol+8EO)orthoformate, tri-(2-ethylhexanol+4EO)orthoacetate, tri-(n-octanol+4EO)orthoacetate, tri-(2-propylheptanol+5EO)orthoacetate, tri-(2-propylheptanol+6EO)orthoacetate, tri-(2-propylheptanol+7EO)orthoacetate, tri-(n-decanol+5EO)orthoacetate, tri-(n-decanol+6EO)orthoacetate, tri-(n-decanol+7EO)orthoacetate, tri-($C_9C_{11}$-alcohol+5.5EO)orthoacetate, tri-($C_9C_{11}$-alcohol+6EO)orthoacetate, tri-($C_9C_{11}$-alcohol+7EO)orthoacetate, tri-($C_{12}C_{14}$-alcohol+6EO)orthoacetate, tri-($C_{12}C_{14}$-alcohol+7EO)orthoacetate, and tri-($C_{12}C_{14}$-alcohol+8EO) orthoacetate.

Suitable examples of compounds according to formula (III) are triesters between nitrilotriacetic acid and oleyl alcohol ethoxylated with 3-9 moles of EO, oleyldibutyl nitrilotriacetate, triesters between nitrilotriacetic acid and C12-C14-alcohol ethoxylated with 2-8 moles of EO, triesters between nitrilotriacetic acid and n-decyl alcohol ethoxylated with 1-7 moles of EO, triesters between nitrilotriacetic acid and 2-propylheptyl alcohol ethoxylated with 1-7 moles of EO, triesters between nitrilotriacetic acid and n-octyl alcohol ethoxylated with 1-5 moles of EO, and triesters between nitrilotriacetic acid and 2-ethylhexyl alcohol ethoxylated with 1-5 moles of EO.

Preferred compounds of formula (IV) are castor oil ethoxylates with 3 to 30 moles of ethylene oxide.

Suitable examples of compounds according to formula (V) are triesters between C8-C22 acids and triethanolamine ethoxylated with 5 to 50, preferably up to 30 moles of ethylene oxide.

Suitable examples of compounds according to formula (VI) are tri-(2-propylheptanol)phosphate, tri-(n-decanol) phosphate, tri-($C_{12}C_{14}$-alcohol+1 EO)-phosphate, tri-($C_{12}C_{14}$-alcohol+2EO)phosphate, tri-($C_{12}C_{14}$-alcohol+3EO)-phosphate, and tri-($C_{12}C_{14}$-alcohol+4EO)phosphate.

The additives of the present invention are preferably added to the mixture of oil and water at a concentration of up to 500 mg/kg (=ppm by weight), more preferably up to 300 mg/kg, even more preferably up to 200 mg/kg, and still more preferably up to 100 mg/kg. The amount may even be as low as up to 50 mg/kg, and in some cases even up to 10 mg/kg.

The pH of the crude oil after the pressure has been lowered and the carbon dioxide released is approximately between 5.5 and 7.5, and the Ca-naphthenate inhibitor may suitably be added at any point in the processing line before the pressure is released.

The temperature of the crude oil at the receiving station is normally between 60 and 70° C., and to obtain optimal performance the amount of ethyleneoxy groups may be adjusted to suit the temperature at the specific station where the inhibitor is to be used.

The inhibitor can be combined with solvents and other chemicals typically used in these applications, and consequently it can be used either as such or in a formulation.

Other additives that may be present in the same formulation as the inhibitors are, e.g., demulsifiers, corrosion inhibitors or paraffin deposition inhibitors, or mixtures thereof.

EXAMPLES

General Experimental

Methods for Evaluation of the Inhibiting Effect of Surfactants on the Formation of Ca-Naphthenate During the Dewatering of Crude Oil
Method Based on Interfacial Tension The method is based on the measurement of the interfacial tension (IFT) of an oil drop containing naphthenic acids in a water solution of sodium borate at pH 9.0 before and after addition of a calcium salt to the water phase to give a Ca++ concentration of 10 mM.

When no inhibitor is present in the oil, the addition of calcium ions will cause a sharp decrease in the IFT, usually of the order of 10 mN/m. This decrease is called Do.

This is due to a transient formation of a cationic surfactant formed from one calcium and one naphthenate ion.

If the naphthenate ion is written as $RCOO^-$, the reaction can be described as:

$$RCOO^- + Ca^{2+} \rightarrow [RCOOCa]+$$

These cationic surfactants will form a mixed anionic/cationic surface layer together with the still unreacted naphthenate ions.

Such a layer will be densely packed due to the mutual attraction between the polar groups and this will manifest itself by a lowering of the IFT.

If a suitable oil-soluble surfactant has been added to the oil, the lowering of the IFT through the addition of calcium ions will be much smaller or not occur at all. The decrease is called Di.

This is taken as an indication of the inhibiting effect (I) of the surfactant.

I can be calculated as

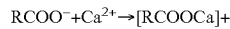

$$I = 100(Do-Di)/Do\%$$

The inhibiting effect is due to the ability of the added surfactant to push aside the naphthenate ions from the surface of the oil drop, either partly or completely.

The measurements were performed in a Drop Volume Tensiometer TVT 1 manufactured by LAUDA.

The oil phase consisted of dodecane containing 1,000 ppm of naphthenic acids from FLUKA with a mean molecular mass of 230 and one carboxylic group per molecule, and 150 ppm of the respective inhibitor.

The dodecane solution containing naphthenic acids was transferred to a syringe containing 2.5 ml, and from this the oil was delivered at a constant rate of 12 microliter/s through a capillary tube with 1.28 mm diameter into the water solution of sodium borate at pH 9.0.

The time for the formation of each of the 10 first drops was recorded and from these values the IFT was calculated accordingly:

$$IFT = VgdPF/C$$

where V=drop volume, g=gravity, dP=density difference oil/water, F=correlation factor, and C=the circumference of the capillary tube.

In our measurements dP=0.250 g/ml, C=0.40 cm, and F=1.24 g is calculated as 981 cm/second².

The formation time for one oil drop is in the range of 1-3 seconds.

IFT measurements were performed at 23, 60, and 70° C.

Method Based on the Optical Density of Oil Containing a Dispersion of Ca-Naphthenate This method is described in the paper by A-M. D. Hanneseth, Ö. Brandal, and J. Sjöblom, "Formation, Growth and Inhibition of Calcium Naphthenate Particles in Oil/Water Systems as Monitored by means of Near Infrared Spectroscopy" in *J. Dispersion Sci. Technol.* 27, 185-192, 2006

For the details of the method see the reference cited above. A detailed description of the method is given on pages 188-191 of this paper.

Example 1

The following measurements of the interfacial tension were performed in a dodecane solution containing 1,000 ppm by weight of naphthenic acids (ex Fluka) with a mean molecular weight of 230 in contact with a borate buffer solution at pH 9.0 at 60° C. The IFT was first determined without any $Ca^{2+}$ ions in the water phase, and then after addition of $CaCl_2$ to yield a concentration of 0.01M. The inhibitor concentration was 150 ppm by weight of the oil phase. 10 drops were formed in each series and the mean value of the interfacial tension (IFT) for the last 9 drops is given as the result.

For the calculation of the inhibitor efficiency, the IFT difference for tests performed without inhibitors was determined to be 9.7 mN/m (=value from test without $CaCl_2$ added—value from test with $CaCl_2$ added).

TABLE 1

| Inhibitor | IFT(0) = a | IFT(Ca) = b | a – b | Inhib. eff. % | Note |
|---|---|---|---|---|---|
| 2-PH-phosphate[1] (Comparison) | 21.5 | 15.0 | 6.5 | 33 | Monoester |
| Tri-(2-PH)-phosphate[2] | 12.9 | 13.6 | −0.7 | 100 | Triester |
| Tri-(2-PH)-phosphate[2] | 13.1 | 13.3 | −0.2 | 100 | Triester |

[1]phosphate ester made from the alcohol 2-propylheptanol and polyphosphoric acid, which mainly yields a monoester of phosphoric acid and minor amounts of the diester (typically ≤5% by weight).
[2]phosphate ester made from the alcohol 2-propylheptanol and $POCl_3$, which mainly yields a triester of phosphoric acid (typically >70% by weight).

It is shown that the triester of 2-propylheptanol is an effective inhibitor, whereas the monoester of 2-propylheptanol is much less efficient.

TABLE 2a

| Inhibitor | Inhibitory effect (%) | Temperature (° C.) |
|---|---|---|
| Castor oil | 2 | 60 |
| Castor oil + 4EO | 74 | 23 |
| Castor oil + 4EO | 61 | 60 |
| Castor oil + 12EO | 80 | 23 |
| Castor oil + 12EO | 77 | 60 |
| Castor oil + 20EO | 60 | 23 |
| Castor oil + 20EO | 89 | 60 |
| Castor oil + 36EO | 8 | 23 |
| Castor oil + 36EO | 37 | 70 |
| OA-7-NTA[4] | 84 | 23 |
| OA-7-NTA[4] | 89 | 60 |
| Oleyldibutyl-NTA[5] | 43 | 60 |
| RA-(TEA-5)[6] | 24 | 60 |
| RA-(TEA-10) | 68 | 60 |
| RA-(TEA-20) | 74 | 23 |
| RA-(TEA-20) | 90 | 60 |
| 3(2-EH + 4EO) + TEOF[7] | 65 | 60 |
| 3(2-EH + 2PO + 4EO) + TEOF[8] | 86 | 60 |
| 3(2-PH + 5EO) + TEOF[9] | 75 | 60 |
| 3(C9-11 + 5.5EO) + TEOF[10] | 73 | 60 |
| Tri-(2-PH)-phosphate | 81 | 60 |

[4]triester of oleyl alcohol + 7 EO and NTA (nitrilotriacetic acid)
[5]mixture of triesters obtained by esterifying one mole of NTA with two moles of butanol and one mole of oleyl alcohol
[6]triester of triethanolamine + 5EO and the fatty acids of rape seed oil (low content of erucic acid)
[7]triethyl orthoformate reacted with three moles of 2-ethylhexanol + 4EO
[8]triethyl orthoformate reacted with three moles of 2-ethylhexanol + 2PO + 4EO
[9]triethyl orthoformate reacted with three moles of 2-propylheptanol + 5EO
[10]triethyl orthoformate reacted with three moles of C9-C11-alkyl alcohol + 5.5EO The Table above shows that it is important to have a balanced proportion between the hydrophobic and hydrophilic portions of the molecule.

It is also shown that the optimal amount of ethyleneoxy groups varies with the temperature.

TABLE 2b

| Inhibitor | Inhibitory effect (%) | Temperature (° C.) |
|---|---|---|
| n-Butylamine + 2EO (Comparison)[11] | 7 | 60° C. |
| OA-7-NTA | 100 | 60° C. |
| RA-(TEA-20) | 100 | 60° C. |

[11]an example of a compound within the range of products disclosed in WO 99/50376 having only one hydrophobic group per molecule The IFT difference for the test performed without inhibitors was determined to be 8.9 mN/m for the experiments of Table 2b, and this value was used to calculate the inhibitory effects.

It is shown that the compounds OA-7-NTA and RA-(TEA-20) having three hydrophobic groups, which are compounds according to the invention, are much more effective inhibitors than butylamine that has been ethoxylated with 2 moles of ethylene oxide, the latter compound having only one hydrophobic group.

Example 2

In this example the inhibiting effect of the additives was determined both by measuring the optical density of the oil phase at 9,500 $cm^{-1}$ and by weighing the interfacial layer formed between the oil and the water phase.

The oil phase in both cases consisted of toluene to which naphthenic acids and inhibitor had been added. When the optical density was measured, the naphthenic acids consisted of p-dodecylbenzoic acid.

In the gravimetric method the C80-tetracids with a mean molecular mass of 1,230 were used.

In both cases the acid concentration was 2 mmol/l.

The water phase consisted of a borate buffer solution at pH 9.0.

Equal volumes of oil and water phase were placed in a beaker with stirring in both phases.

The test was started by adding $CaCl_2$-solution to the water phase to make a 4 mM solution with respect to Ca++.

The optical density was then recorded during 2 hours in the first case and the interfacial layer was isolated from the beaker and dried after the same time in the second case.

The square root of the optical density is considered to be proportional to the total amount of Ca-naphthenate particles in the oil phase.

If the square root of the optical density is denoted Co without inhibitor and Ci with inhibitor, then the inhibiting effect (I) is calculated as I=100(Co−Ci)/Co %. In the gravimetric method the inhibiting effect is calculated from the weight of the dried interfacial layer without and with inhibitor in the same way.

TABLE 3

| | | Optical method | | | |
|---|---|---|---|---|---|
| Inhibitor | Concentration (mg/l) | "Naphthenic acid" | Concentration (mg/l) | Temperature (° C.) | Inhibitory effect (%) |
| Castor oil + 4EO | 20 | p-dodecyl-benzoic acid | 580 | 25 | 94 |
| Castor oil + 20 EO | 20 | p-dodecyl-benzoic acid | 580 | 25 | 90 |

TABLE 4

| | | Gravimetric method | | | |
|---|---|---|---|---|---|
| Inhibitor | Concentration (mg/l) | "Naphthenic acid" | Concentration (mg/l) | Temperature (° C.) | Inhibitory effect (%) |
| Castor oil + 4EO | 20 | C80-tetra-acid | 2460 | 25 | 75 |
| Castor oil + 4 EO | 20 | C80-tetra-acid | 2460 | 50 | 85 |
| Castor oil + 20 EO | 20 | C80-tetra-acid | 2460 | 25 | 58 |
| Castor oil + 20 EO | 20 | C80-tetra-acid | 2460 | 50 | 95 |

The invention claimed is:

1. A method for preventing the formation of calcium carboxylates in a crude oil/water stream containing carboxylic acids and $Ca^{2+}$ ions, said method comprising adding a compound to said crude oil/water stream at a point upstream of a pressure reduction valve in a receiving station, said compound having the formula

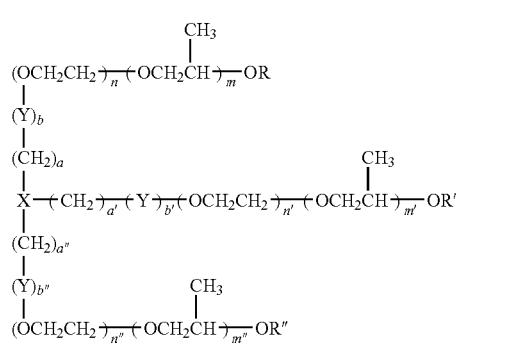

(I)

wherein R, R', and R" are, independently, an optionally substituted hydrocarbyl group or an optionally substituted acyl group having 4-22 carbon atoms; X is N, P=O or CR''', wherein R''' is H or a C1-C4 alkyl group; Y is C=O or $CH_2$; a, a'', a', b, b', and b'' each independently are 0 or 1; n, n', and n'' each independently are on average a number 0-14, the sum of n, n', and n'' in the molecule being 0-42; and m, m', and m'' each independently are on average a number 0-6, the sum of m, m', and m'' in the molecule being 0-18.

2. A method according to claim 1 where the compound has the formula

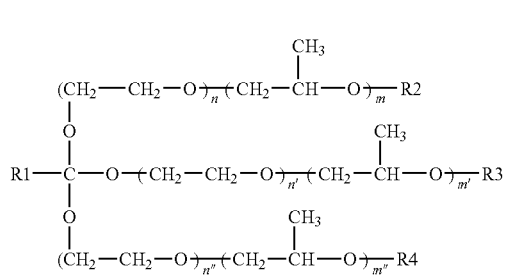

(II)

wherein R1 is H or a C1-C4 alkyl group, R2, R3, and R4 are, independently, a C4-C22 hydrocarbyl group; n, n', and n'', the sum of n, n', and n'', m, m', and m'', and the sum of m, m', and m'' have the same values as in claim 1.

3. A method according to claim 1 where the compound has the formula

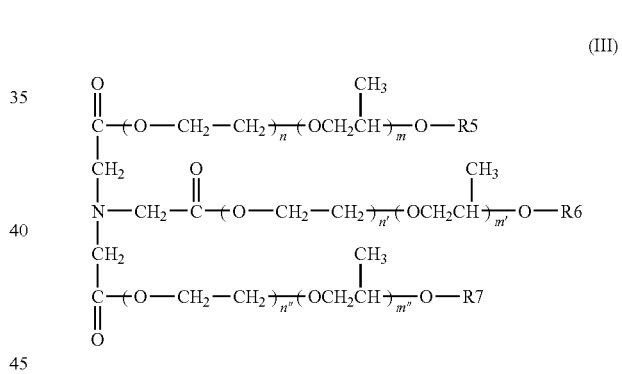

(III)

wherein R5, R6, and R7 are, independently, a C4 to C22 hydrocarbyl group; n, n', and n'', the sum of n, n', and n'', m, m', and m'', and the sum of m, m', and m'' have the same values as in claim 1.

4. A method according to claim 1 where the compound has the formula

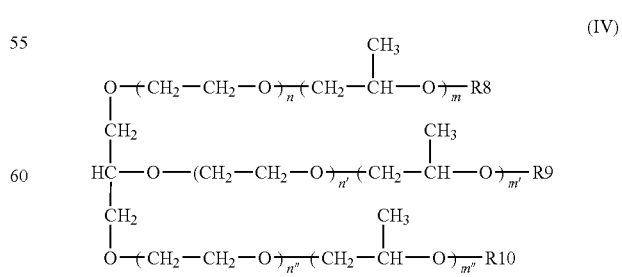

(IV)

wherein R8, R9, and R10 are, independently, an optionally substituted acyl group with 6 to 22 carbon atoms, n, n' and n'', the sum of n, n' and n", m, m' and m" and the sum of m, m' and m" have the same values as in claim 1.

5. A method according to claim 1 where the compound has the formula

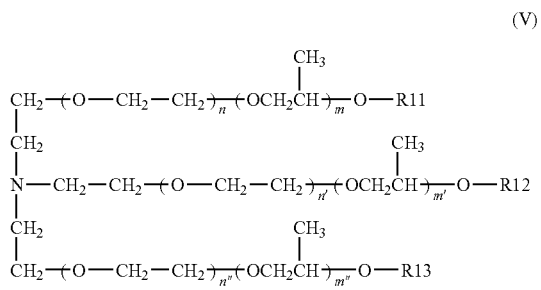

(V)

wherein R11, R12, and R13 are, independently, an optionally substituted acyl group with 6 to 22 carbon atoms; n, n' and n", the sum of n, n' and n", m, m' and m" and the sum of m, m' and m" have the same values as in claim 1.

6. A method according to claim 1 where the compound has the formula

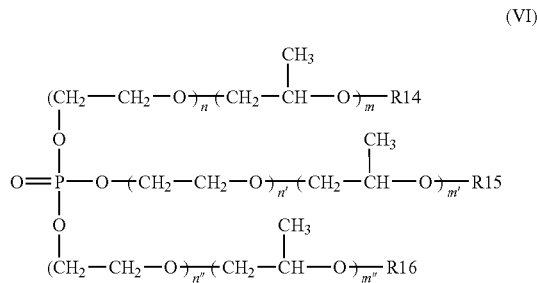

(VI)

wherein R14, R15, and R16 are, independently, a C10 to C22 hydrocarbyl group; n, n' and n", the sum of n, n' and n", m, m' and m" and the sum of m, m' and m" have the same values as in claim 1.

7. A method according to claim 1 wherein the compound is added in a concentration of up to 500 ppm by weight.

8. A method according to claim 1 wherein the compound is added in a formulation together with demulsifiers, corrosion inhibitors or paraffin deposition inhibitors, or mixtures thereof.

9. A method according to claim 1 wherein the temperature of the crude oil at the receiving station is 60-70° C.

10. The method according to claim 1 wherein R, R', and R" are, independently, an optionally substituted hydrocarbyl group or an optionally substituted acyl group having 6-22 carbon atoms.

11. The method according to claim 1 wherein R, R', and R" are, independently, an optionally substituted hydrocarbyl group or an optionally substituted acyl group having 8-22 carbon atoms.

12. The method according to claim 1 wherein R, R', and R" are, independently, an optionally substituted hydrocarbyl group or an optionally substituted acyl group having 10-22 carbon atoms.

13. The method according to claim 2 wherein R2, R3, and R4 are, independently, a C6-C22 hydrocarbyl group.

14. The method according to claim 2 wherein R2, R3, and R4 are, independently, a C8-C22 hydrocarbyl group.

15. The method according to claim 2 wherein R2, R3, and R4 are, independently, a C10-C22 hydrocarbyl group.

16. The method according to claim 1, which further comprises transferring said crude oil/water stream from a production well to said receiving station, adding the compound to said crude oil/water stream upstream of the pressure reduction valve in said receiving station to form a crude oil/water/compound stream and processing said crude oil/water/compound stream through said pressure reduction valve.

17. A crude oil recovery process, said process comprising recovering a crude oil/water stream containing carboxylic acids and $Ca^{2+}$ ions, and further comprising adding a compound to said stream in order to inhibit the formation of calcium salts of carboxylic acids during said process, wherein said compound added to said stream has the formula (I)

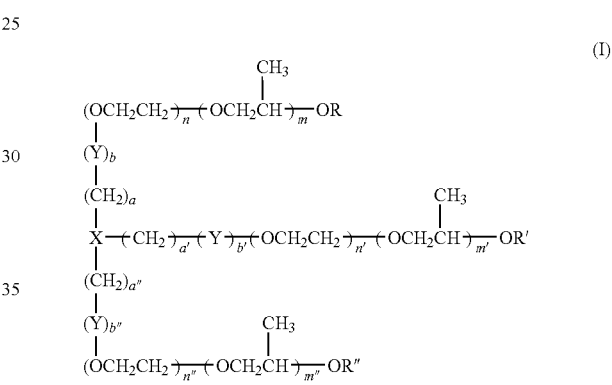

(I)

wherein R, R', and R" are, independently, an optionally substituted hydrocarbyl group or an optionally substituted acyl group having 4-22 carbon atoms; X is N, P=O or CR''', wherein R''' is H or a C1-C4 alkyl group; Y is C=O or $CH_2$; a, a', a", b, b', and b" each independently are 0 or 1;
n, n', and n" each independently are on average a number 0-14, the sum of n, n', and n" in the molecule being 0-42; and m, m', and m" each independently are on average a number 0-6, the sum of m, m', and m" in the molecule being 0-18.

18. The method according to claim 17, which further comprises transferring said crude oil/water stream from a production well to a receiving station, adding the compound to said crude oil/water stream upstream of a pressure reduction valve in said receiving station to form a crude oil/water/compound stream and processing said crude oil/water/compound stream through said pressure reduction valve.

* * * * *